Sept. 8, 1964 D. VOEGTLEN 3,148,247
ELECTRONIC SELECTION CIRCUITS
Filed Aug. 16, 1962
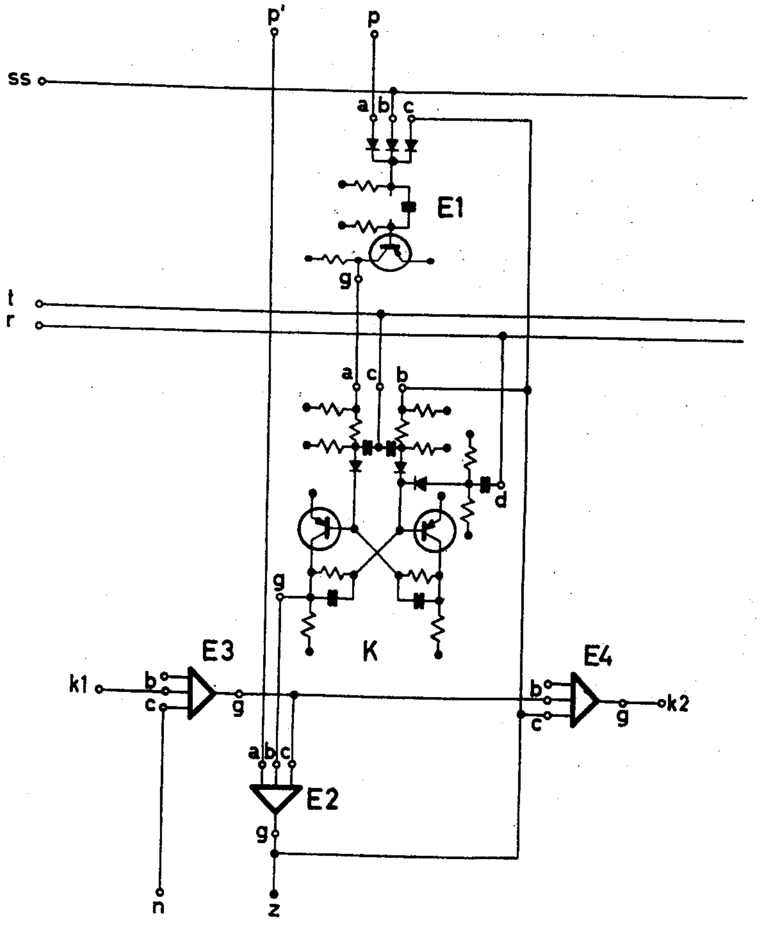

United States Patent Office 3,148,247
Patented Sept. 8, 1964

3,148,247
ELECTRONIC SELECTION CIRCUITS

Dieter Voegtlen, Munich, Germany, assignor to Siemens & Halske Aktiengesellschaft, Berlin and Munich, a corporation of Germany Filed Aug. 16, 1962, Ser. No. 217,765
Claims priority, application Germany Aug. 18, 1961
21 Claims. (Cl. 179—18)

The invention disclosed herein is concerned with an electronic selection circuit which may be considered as an improvement on the circuits described in copending application Serial No. 722,357, filed March 18, 1958, now Patent No. 3,051,793, dated August 28, 1962.

The electronic selection circuits described in the above noted copending application serve respectively for marking, from a plurality of devices, some of which may be busy, the first device found to be idle in a definite sequence, by the application of a potential which is by its magnitude distinguished from the potentials extended to the remaining devices.

The corresponding selection circuit therefore can take the place of known selectors. Its most important advantage is seen to reside in the fact that practically the same time is required for any desired selection operation, irrespective of the position, in the sequence of devices, of the device which is being marked.

The electronic selection circuit comprises a plurality of switching stages corresponding in number to the number of devices connected therewith. Each device connects to its associated stage a potential of a magnitude which indicates its momentary busy or idle condition. These magnitudes, therefore, can occur as two values, namely, as a busy potential or a potential indicating idle condition. Since there are in the individual stages and their cooperation always only potential differences effective and evaluated, there are with respect to the absolute values of these potentials no limiting requirements. These absolute values therefore can be determined for all stages in common corresponding to exterior conditions under which the selection circuit must operate. For the marking of a device determined by the selection operation, the selection circuit conducts to the device a marking potential which distinguishes in its magnitude from the neutral potential conducted to all remaining devices.

Each switching stage has a testing input to which the associated device transmits the potential indicating its momentarily prevailing idle or busy condition, and also has a marking output over which the marking potential required for the marking of the associated device is conducted to such device. Each switching stage has moreover a coupling input and a coupling output, whereby the potential conducted to the coupling input can affect the corresponding switching stage while the potential delivered over the coupling output can affect other switching stages. The respective potentials of the coupling input and coupling output can assume two values corresponding to the two values that may be assumed by the potential respectively conducted to the testing input and delivered by the marking output, namely, idle and busy potential and marking and neutral potential, respectively. One of the two values, the busy or blocking potential, can effect an operation which is omitted in the case of the idle potential.

It is characteristic for each switching stage that the potential at the marking output assumes one certain of the two values only when the potentials conducted to the testing input and to the coupling inputs have predetermined values so that, upon appearance of the certain potential value at the marking output, the potential at the coupling input will assume a value complementary to the potential conducted to the coupling input, and that the potential at the coupling output will assume about the value of the potential at the coupling input when the potential at the coupling input has a value which prevents appearance of the certain potential value at the marking output.

The previously indicated characteristic behavior of the switching stage according to the invention, so far as the delivery of potential depending upon input potential is concerned, may also be stated in the manner of three criteria, namely (1) when the coupling input has release potential and the testing input has idle potential, the marking output will have marking potential and the coupling output will have blocking potential; (2) when the coupling input has release potential and the testing input has busy potential, the marking output will have a neutral potential and the coupling output will have release potential; and (3) when the coupling input has blocking potential, the marking output will have the neutral potential and the coupling output will have blocking potential regardless of the potential that might be on the testing input.

In order to prevent the possibility of double seizure due to a device located ahead of the selected device becoming idle while the marking of the selected device progresses, and to effect as quickly as possible the marking of a selected device as being busy, it is in various cases required that the above explained switching stage be provided with the features of a storer. In the previously noted copending application Serial No. 722,357 are described switching stages which are provided with storers respectively individual thereto, such storers being, with the release limited as to time, placed in operating condition, when potential indicating idle condition is at least on the testing input, and wherein means are provided for blocking the delivery of the marking potential at the marking output until completion of the release of the respective storer.

The characteristic feature of the operation of the above indicated selection circuits, the switching stages of which are provided with storers, resides in that they effect with each triggering a single marking operation and that the storers which are at the beginning of the marking operation placed into operated condition are, at the conclusion of the marking, restored in common, to the normal or resting position, whereby they are put in readiness for the next marking operation which is initiated by triggering a criterion therefor. This triggering again effects the storing operation followed by the further functions which are required.

The advantages of the described operation are clearly apparent so long as the criteria which are important for the setting of the storers, that is, the potentials denoting idle condition, are in the corresponding arrangements, given off or supplied by the devices served by the selection circuit. However, matters are under given circumstances different when the momentary busy conditions of the devices served by the selection circuit are, due to peculiarities of the respective communication system, retained in a separate condition-storer which extends to the selection circuit the corresponding criteria, that is, potential denoting idle or busy condition, responsive to a readout operation. In the event that this condition-storer is constructed of ferromagnetic ring cores, which is desirable for reasons of costs, the information which is stored in the individual cores is cancelled upon extension thereof to the selection circuit and therefore must be newly stored in accordance with changed conditions of the marking operation. The respective storer is during this storing operation unavailable for other functions which require its cooperation.

The object of the invention is to reduce, to the smallest possible minimum, these storing intervals which are to be considered as dead or wasted intervals. This object is realized with the aid of the storers which are for the initially indicated reasons appropriately provided in the switching stages of the selection circuit, such storers being operated in definite manner to which the switching stages are adapted.

Each of these switches stages is to be considered in the nature of a further development on the switching stage with storing properties as described in the previously noted copending application Serial No. 722,357, having in addition thereto the further feature according to which the storer of the switching stage is restored to the normal or resting position upon appearance of the marking potential at the marking output and extension of a timing impulse to a timing input.

The foregoing and other features and objects will now be described with reference to the accompanying drawing showing an embodiment of a switching stage according to the invention.

It happens often in telephone systems that a device which is idle cannot be marked as being idle, but that the marking must be made dependent upon another criterion. As an example for such condition may be mentioned a line section of an indirectly controlled communication system, for the marking of which the fact that it is idle, is insufficient. The marking of such line section must be made dependent upon whether or not it can be interconnected with a further suitable line section. Accordingly, two mutally independent criteria must be extended to each switching stage of the selection circuit which carries out the marking, thus resulting in the provision of two testing inputs for each switching stage. In accordance with the thought underlying the invention, this leads to a very definite utilization of the criterion extended to the second testing input. The storer of a switching stage is in any case placed into operating condition responsive to conducting to the first testing input a potential which indicates idle condition, even when it is established, according to the criterion conducted to the second testing input, that the corresponding switching stage cannot effect the marking of the device associated therewith. Accordingly, the storer of the respective switching stage is, incident to the subsequent selection operation, not restored to normal, which would require extension of a marking potential, but remains in readiness for further selection operations incident to which it may be necessary, due to conditions then prevailing, that the criterion conducted to the second testing input be utilized for the marking of the respective device. A new storing is required only when the storers of all switching stages had been successively restored to normal position or in the event that no marking is effected despite the fact that storers are still in operated position and despite the fact that a triggering had taken place, such latter condition signifying that no suitable idle device is available for the connection to be effected although idle devices as such may be present. Devices which become idle in the interim are then considered by the new storing.

The illustrated switching stage is so constructed that the null point in a selection circuit built up of such switching stages, which is to be operated with arbitrarily determinable null point of the marking series sequence, can be electronically determined.

Another aspect which is important for the arrangement of the illustrated embodiment has to do with the increasingly observed tendency to employ in the construction of the arrangement to a far reaching extent so-called standard component groups, so as to enable the use of automatic production methods. The embodiment described below requires only two different standard component groups.

The first standard component group, shown in detail in the upper part of the drawing and marked E1, represents an inverting amplifier with a pnp transistor operating in emitter circuit, the collector, which is provided with a resistor, being connected with an output *g*. Three mutually similar inputs, *a*, *b*, *c* are connected with the base of the transistor over a gate circuit comprising directional conductors or diodes and over a resistance combination which serves for applying a bias voltage. The operating voltages and bias voltages supplied to each such component group are so selected that the respective transistor is conductive in the presence of negative potential or no potential at the inputs *a*, *b*, *c*, whereby positive potential is placed on the output *g*. The transistor will be in blocking condition or at cutoff in the presence of positive potential or at least one of the inputs *a*, *b*, or *c*, and the output *g* will the have positive potential. The terms "positive potential" and "negative potential" refer to an average value formed from both values and therefore are to be understood as being relative values.

The other standard component group K shown in detail in the central part of the figure represents a known bistable flip flop circuit constructed of two direct current coupled transistors operating in emitter circuit. The base electrodes of the transistors are respectively connected with the inputs *a* and *b*, each over a diode and a serially disposed resistance combination serving for the supply of the bias voltage; the connecting points of the resistance combination with the diodes are over capacitors connected to a common input *c*. The collector of one of the transistors is connected with an output *g* and the base of the other transistor is connected with an input *d* by way of a series circuit including a diode and a capacitor, at the connecting point of which is disposed a resistance combination serving for the supply of the bias voltage. The flip flop circuit is constructed fully symmetrically, some parts which are not being used for the purpose in view being however omitted.

For the sake of simplicity, the above indicated standard component groups are in the following description referred to as E and K and the inputs and outputs thereof are referred to by using the corresponding letter as a prefix; thus, the output of the standard component group E2 is referred to as *g*E2.

The switching stage comprises four component groups E1 to E4 of the first kind and a component group K of the second kind which operates as a storer. The operating voltages and bias voltages of the transistors are so selected that the component groups can be connected together directly, that is, without the use of any potential-displacing means.

The outputs *a*E1, *b*E1 and *c*E1 of the component group E1 are respectively connected to the testing input *p*, the storage control input ss, and to the marking output *z*; the output *g*E1 of this component group E1 is connected to the input *a*K of the component group K. The further inputs *b*K, *c*K and *d*K of this component group K are respectively connected to the marking output *z*, the timing input *t*, and to a restoring input *r*; the output *g*K of this component group K is connected to the input *b*E2 of the component group E2, the output *g*E2 of which is connected to the marking output *z* while the input *a*E2 is connected with a further testing input *p'*. The inputs *b*E3 and *c*E3 are respectively connected with the coupling input *k*1 and with an input *n* which serves for determining the null point of the marking series sequence; the output *g*E3 of this component group E3 is connected with the input *c*E2 of the component group E2 and with the input *b*E4 of the component group E4, the output *g*E4 of which is connected with the coupling input *k*2 while the input *c*E4 is extended to the marking output *z*.

It is for the explanation of the operation of the switching stage deemed sufficient to show that it fulfills the three initially named criteria, also the further above indicated condition, and the manner in which this is done, since such explanations will make it possible to readily interconnect switching stages of this kind so as to form a selection circuit which satisfies the desired requirements. As noted before, the terms "positive potential" and "negative potential" are to be understood as relative values. In a borderline case, one of these values may disappear, which means, that the respective input does not receive any defined potential. However, such borderline case does not form an exception since it merely represents a simplification which may always be traced to the case of a suitable defined potential.

In the above described embodiment, the potentials indicating respectively busy condition, release condition and marking, are positive; accordingly, potentials denoting respectively idle condition, blocking condition and neutral condition, are negative. (Potentials indicating respectively idle condition or busy condition will be hereinafter referred to, for the sake of simpilicity, as "idle potential" and "busy potential," respectively.) The two values which the potential conducted to the second testing input $p'$ can assume shall likewise be referred to respectively as idle potential and busy potential, such potentials giving information as to the operating condition of the device with which is to be connected the device which is allocated to the respective switching stage. A marking potential delivery must be effected by the switching stage only when the negative idle potential is extended to the second testing input $p'$. The storage control input *ss* carries positive potential; in order to effect the storing, a negative impulse is extended thereto. The timing input *t* and the restoring input *r* can have any desired potential since they extend to the blocked inputs of the flip flop circuit K. They extend to the switching stages positive impulses for effecting the release of the corresponding operations. The input *n* provided for determining the null point receives positive potential when the selection circuit is to be operated with arbitrarily determinable null point and when the respective switching stage is to be the first one in the marking series sequence; if this is not the case, this input *n* receives negative potential or remains unconnected.

In the normal or resting position of the switching stage, there will be negative potential on the output *g*E1 owing to the positive potential which is conducted to the input *b*E1 over the storage control input *ss*. The transistor in the flip flop circuit K, which is connected to the output *g*K, conducts current, whereby the positive potential is from the output *g*K extended to the input *b*E2, resulting at the output *g*E2 and therewith at the marking output *z* in a negative potential which acts as a neutral potential. These potential conditions are independent of the kind of potentials which are respectively extended to the two testing inputs *p* and $p'$ the coupling input *k*1 and the auxiliary input *n*.

When the negative idle potential is delivered to the testing input *p* while the positive release potential (indicating that a given device has become idle) is delivered to the coupling input *k*1, and when the storing is made possible by the transition of the positive potential at the storage control input *ss*, to a negative potential, there will result the following potential conditions:

Owing to the negative potentials at the inputs *a*E1 and *c*E1 and the potential becoming negative at the input *b*E1 the output and therewith the input *ak* will receive positive potential. However, this positive potential is insufficient for blocking the current conducting transistor so as to flip the flip flop circuit K. When a positive impulse is now conducted from the timing input to the input *ck*, such impulse will be added to the positive potential delivered from the input *ak*, thereby blocking the transistor which until now conducted current, and thus placing the flip flop circuit K into operated position in which it remains even after the decay of the impulse extended to the input *ck*. The idle condition of the respective device, which has been signified by the idle potential at the testing input *p*, is thereby stored. The output *gk* and therewith the input *b*E2 now have negative potential owing to the operation of the flip flop circuit K. The input *b*E3 now has positive potential owing to the positive release potential at the coupling input *k*1, thereby, causing negative potential to appear at the output *g*E3 and therewith also at the input *c*E2. The inputs *b*E2 and *c*E2 have now positive potential, the delivery of the marking potential depending however upon the potential on the second testing input $p'$ to which is connected the input *a*E2.

In the event that this second testing input $p'$ has negative potential, the output *g*E2 will receive positive potential which will appear as a marking potential at the marking *z*. This positive potential also reaches the inputs *c*E4 and *c*E1 and likewise the input *b*K. Positive potential accordingly appears at the output *g*E4 which acts at the coupling output *k*2 as a blocking potential. The base bias of the current conducting transistor is by this potential over the input *b*K displaced in positive direction, but is not effective to place the flip flop circuit K into normal position. At the input *c*E1, this positive potential acts in the same manner as the positive potential conducted to the testing input *p* and therewith to the input *a*E1 and thus causes, provided that the storage control input *ss* still has negative potential, appearance of negative potential at the output *g*E1, which is conducted to the input *a*K, thereby likewise preparing the flipping of the flip flop circuit K by displacement of the base potential of the nonconducting transistor in negative direction.

A further positive impulse is extended to the timing input *t* so as to conclude the marking potential delivery. This impulse is added to the base potential of the current conducting transistor, which base potential had already been shifted in positive direction by the potential conducted thereto over the input *b*K, whereby this transistor is blocked while the other transistor is again made conductive, thus restoring the flip flop circuit K to its normal position in which the potential at the output *g*K is positive. The marking output *z* thereby assumes again the negative neutral potential. The resoration of the flip flop circuit K is reliably effected, despite the disappearance of the required preparatory voltage at the input *b*K, which is derived from the output *g*K, by the action of the capacitor serving for the delivery of the timing pulse, such capacitor which had been charged with the preparatory voltage retaining it during the restoring operation and acting in this manner as a storer.

However, in the event that the second testing input $p'$ carries positive potential in the assumed situation (idle potential at the first testing input *p* and release potential at the coupling input *k*1, with the potential conditions resulting therefrom), such positive potential effects over the input *a*E2 negative potential at the output *g*E2, such negative potential acting at the marking output *z* as neutral potential which also reaches the inputs *c*E4, *c*E1 and *b*K. Since the coupling input *k*1 has positive release potential, which appears at the input *b*E3, the output *g*E3 and therewith the input *b*E4 will have negative potential, thus causing in coaction with the negative potential at the input *c*E4, appearance of positive potential at the output *g*E4 and therewith appearance of release potential at the coupling output *k*2. The stage which is next in the marking series sequence, the testing inputs *p* and $p'$ of which have idle potential, is thereby placed in condition to deliver a marking potential.

Upon placing positive busy potential on the testing input *p* and positive release potential on the testing input *k*1, there will result the following potential conditions:

Owing to the positive busy potential at the testing input *p* and therewith at the input *a*E1, the output *g*E1 will retain negative potential, even when the positive potential at the storage control input *ss* is for the storing changed to a negative potential. The flip flop circuit K remains, due to the negative potential at the input *a*K which is extended thereto from the output *g*E1, a rest when a positive impulse appearing at the timing input *t* is extended to its input *c*K. The transistor connected to the output *g*K continues to conduct current and the output *g*K and therewith the input *b*E2 accordingly continue to retain positive potential, the output $g$E2 therefore retaining negative potential which acts at the marking output $z$ as neutral potential. The potential conditions at the inputs $c$E1, $b$K and $c$E4, which are connected to the marking output $z$, thus remain unaltered. The positive release potential conducted to the coupling input $k$1 causes negative potential to appear at the output $g$E3, the two inputs $b$E4 and $c$E2 now having negative potential, causing a potential to appear at the coupling output $k$2, which acts as a release potential.

Upon conducting to the coupling $k$1 the negative blocking potential, the output $g$E3 will have positive potential which causes negative potential to appear at the output $g$E4, such negative potential acting at the coupling output $k$2 as a blocking potential irrespective of which potentials are conducted to the two testing inputs $p$ and $p'$ and irrespective of the position in which the flip flop circuit K happens to be. The positive potential at the output $g$E3 also causes negative potential to appear at the output $g$E2 which in turn causes appearance of such negative potential at the marking output $z$, acting as a neutral potential, likewise irrespective of the potentials at the testing inputs $p$ and $p'$ and of the position of the flip flop circuit K.

It will be apparent from the foregoing explanations that the illustrated switching stage fulfills the previously named three criteria and that it therefore can be interconnected with other similar switching stages, to form a selection circuit, it being for this purpose merely necessary to connect the coupling input of each respective switching stage with the coupling output of the respectively preceding switching stage.

A chain circuit formed in this manner constitutes a selection circuit with invariably the same marking series sequence proceeding from a fixed null point. In such case, the inputs $n$ of the switching stages remain disconnected. The control of the marking potential delivery is effected by connecting ahead of the coupling input $k$1 of the switching stage which is first in the chain circuit, a control device which extends to such first switching stage a release potential only for the desired duration of the marking potential delivery. This extension of the release potential can be effected at any desired late instant, since the storing of the busy condition of the devices served by the selection circuit, is independent of the presence of the release potential. This feature also makes it possible to effect, as desired, a new storing only at a time either when all storers which had been placed in operated position are by the marking of the respective devices successively restored to resting position or when the selection circuit cannot resolve a given switching problem despite the storers which are still in operated position, owing to the potentials conducted to the second testing inputs $p'$.

Selection circuits will be preferred as a rule, in which the null point and therewith the marking sequence can be determined at will, for example, incident to each marking operation. The chain circuit of the switching stages is for this mode of operation circuited in a ring circuit. The null point is in such case determined by conducting a positive potential to the auxiliary input $n$ of the respective switching stage which is to be the first one in the marking series sequence, while negative potential is extended to the corresponding inputs of all remaining switching stage. This positive potential which is conducted to this one input $n$, acts in the same manner as the release potential extended to the coupling input $k$1 of the first switching stage, in the case of a selection circuit operating with invariably the same null point, and therefore can be utilized in identical manner for the control of the marking potential delivery.

Keeping in mind the above explanations concerning the operations of a single switching stage, there will now be considered the operations of a selection circuit constructed of such switching stages, which operations require, as desired, that a new storing is to be carried out only when the storers of all switching stages have been restored to resting position or in the event that a marking cannot be effected despite the presence of storers which are in operating position, owing to the fact that busy potential has been extended to the second testing inputs $p'$ of the respective switching stages.

In order to place the selection circuit in operation, the condition-storer which is connected ahead of the testing inputs $p$, and which delivers information as to the operation condition of the respective devices, is activated for the delivery of the corresponding information, and a negative impulse is placed on the storing control input $ss$ so as to enable the storing in the storer K of the respective switching stages; the corresponding storing is thereupon effected by the action of a positive impulse on the timing input $t$. When the positive release potential is now delivered to the coupling input $k$1 of the first switching stage or when a corresponding positive potential which determines the null point, is conducted to the auxiliary input $n$ of the respective first switching stage, such switching stage, which is first in the marking series sequence, and the storer K of which is in operating position, while the release potential is extended to its second testing input $p'$, will deliver marking potential at the marking potential at the marking output $z$. The storer K of the switching stage which has just delivered marking potential, is upon conclusion of the marking operation, when the positive release potential is disconnected from the coupling input $k$1 or when the positive potential which determines the null point is disconnected from the auxiliary input $n$, restored to resting position by the action of a positive impulse conducted to all switching stages over the timing impulse input $t$. Storers K of other switching stages, which are in operating position, are not affected by this restoring operation. When the delivery of the marking potential is now again initiated by corresponding potential extension to the coupling input or to the auxiliary input $n$ of a switching stage which acts as first stage, such stage, in which the storer K is in operated position and having release potential on the second testing input $p'$ theerof, will deliver marking potential. Marking potential delivery can in this manner be successively effected without carrying out any new storing operation, until the storers K of all switching stages are restored to resting position or else, until no switching stage is available in which the storer K is in operated position in the presence of release potential on the second testing input $p'$. A new storing is to be carried out only upon occurrence of one of these two conditions. It is in connection with the successively effected marking operations readily possible to change the null point and therewith the marking series sequence after each marking operation.

The above described control for the marking potential delivery can be omitted in the event that the devices connected with the marking outputs $z$ of the selection circuit are with the aid of timing means controlled for the evaluation of the marking potentials conducted thereto. The timing control must in such case operate so that the evaluation of the marking potentials can be effected only when the marking potential delivery is definite.

The function of the restoring input $r$ will now be described. A restoration of the storers of the individual switching stages, by means of an impulse conducted to the restoring input $r$ is under the above explained normal operating conditions not required, since such restoration is already a part of the switching functions. However, such restoration gains importance in the event of a disturbance or incident to routine switching-over to a substitute device. Upon conducting to the selection circuit the operating voltages, for example, after an interruption of operation or for placing the circuit initially in operation, it will depend upon chance which of the storers K assume respectively the resting position or the operated position. In order to create a definite initial or starting condition, a positive impulse is, after the switching-in of the selection circuit, extended to the restoring input r, such impulse being effective to place into resting position all storers K which happen to be in operated condition, whereupon the storing can be carried out as described before.

Changes may be made within the scope and spirit of the appended claims which define what is believed to be new and desired to have protected by Letters Patent.

I claim:

1. In a signalling system, a selection circuit having a plurality of switching stages, each of said switching stages having a testing input for receiving a potential signifying idle or busy condition, a marking output for extending a potential signifying neutral condition or marking condition, a coupling input and a coupling output for respectively receiving and extending a potential signifying release or blocking, a first gate having a first input connected with said coupling input and having an output connected with said coupling output, said first gate extending the blocking potential from said coupling input to said coupling output, a second gate of a type complementary to said first gate, said second gate being jointly controlled by the potentials at said coupling input and said testing input and extending a marking potential to said marking output responsive to a release potential and an idle potential respectively extended to said coupling input and to said testing input, and an inverter for adapting the potential at said coupling input or said testing input for use in said first or said second gate to provide thereby a blocking potential at a second input of said first gate in response to a release potential and an idle potential extended respectively to said coupling input and to said testing input, each of said switching stages comprising further storage device assuming operated position responsive to potential of predetermined value appearing at said testing input and retaining said operated position for a predetermined time interval at the termination of which said storage device is released, means for blocking the appearance of marking potential on said marking output until the release of said storage device, and comprising further means for releasing said storage device when the marking potential is extended to the marking output and a timing pulse is extended to a timing pulse input of said storage device.

2. An arrangement and cooperation of parts according to claim 1, comprising means for deriving the blocking potential at the coupling output from the marking potential at the marking output.

3. An arrangement and cooperation of parts according to claim 2, comprising an input for restoring the storer to resting position, and means for connecting said input with the marking output.

4. An arrangement and cooperation of parts according to claim 3, comprising an intermediate storer forming part of said storer, and circuit means for causing said intermediate storer to maintain during the restoration of the storer the potential delivered at the marking output.

5. An arrangement and cooperation of parts according to claim 4, wherein said storer is constructed symmetrically as a flip flop circuit having two parts, and means for connecting said timing input symmetrically with said two parts.

6. An arrangement and cooperation of parts according to claim 5, comprising capacitor means disposed between said timing input and the respective parts of the storer, one of said capacitor means operating as an intermediate storer.

7. An arrangement and cooperation of parts according to claim 1, comprising means forming a restoring input individual to said flip flop circuit.

8. An arrangement and cooperation of parts according to claim 1, comprising means disposed ahead of said marking output and connected to a second testing input to which is conducted idle or busy potential, said means being operative to cause delivery of marking potential at the marking output only when idle potential is extended to said second testing input.

9. An arrangement and cooperation of parts according to claim 1, comprising a gate circuit disposed between the testing input and the storer, means forming a storer control input connected with said gate circuit, means for conducting a potential to said testing input, and means for conducting a signal to said storer control input, whereby said storer is placed into operated position only when idle potential is conducted to said testing input in the presence of a signal conducted to said storer control input.

10. An arrangement and cooperation of parts according to claim 1, comprising switching means disposed between the coupling input and the coupling output, an auxiliary input for said switching means, a potential conducted to said auxiliary input, serving for the determination of the null point having the same effect as an idle potential conducted to said coupling input.

11. An arrangement and cooperation of parts according to claim 1, said arrangement being constructed of directly interconnected standard component groups, each of said groups comprising an amplifier including a transistor operating in emitter-base-circuit, means serving for the supply of bias voltage connected with the respective base electrodes, and a diode gate circuit comprising at least three inputs connected ahead of said bias voltage supply means.

12. An arrangement and cooperation of parts according to claim 11, comprising means for connecting one input of the first component group with said coupling input, means for connecting the output of said first group with an input of the second component group the output of which is connected to the coupling output, means for connecting such first component group with an input of a third component group having an output which is connected with said marking output, means for connecting an output of said second component group with said marking output, and means for connecting an input of the third component group with an output of the storer.

13. An arrangement and cooperation of parts according to claim 12, wherein said bistable flip flop circuit is connected with two inputs which inputs are connected in direct current coupling with the active elements of the two parts thereof, said two inputs serving for extending thereover the potential which prepares the flip flop circuit for actuation respectively into operated and resting position thereof.

14. An arrangement and cooperation of parts according to claim 13, wherein said bistable flip flop circuit comprises an input serving the same active element as the input for extending the preparatory potential for the restoring operation, and having a further input which is decoupled with respect to the input first noted herein, and means for connecting said further input to an input serving for extending the potential which effects the restoring operation.

15. An arrangement and cooperation of parts according to claim 14, comprising means for connecting the second testing input with an input of the third component group.

16. An arrangement and cooperation of parts according to claim 14, comprising a fourth standard component group having an input connected with the testing input and a further input connected with the storer control input and having an output connected with the input of the flip flop circuit, which serves for the extension of the potential preparing the actuation thereof into the operated position.

17. An arrangement and cooperation of parts according to claim 16, comprising means for connecting one input of said fourth component group with said marking output.

18. An arrangement and cooperation of parts according to claim 1, comprising means for connecting the coupling input of each but the first switching stage with the coupling output of the respectively preceding switching stage.

19. An arrangement and cooperation of parts according to claim 18, comprising a starting device connected ahead of the coupling input of the first switching stage, said starting device supplying the release potential limited as to time.

20. An arrangement and cooperation of parts according to claim 17, wherein said switching stages are interconnected in a ring circuit, comprising means for determining the null point whereby the potential which determines the null point is extended over the auxiliary input always of one given switching stage.

21. An arrangement and cooperation of parts according to claim 20, wherein the potential which determines the null point is supplied limited as to time.

No references cited.